(12) United States Patent
Komiya (10) Patent No.: US 7,360,621 B2
(45) Date of Patent: Apr. 22, 2008

(54) SUSPENSION CROSS MEMBER OF AUTOMOTIVE VEHICLE

(75) Inventor: Katsuyuki Komiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 427 days.

(21) Appl. No.: 11/049,056

(22) Filed: Feb. 3, 2005

(65) Prior Publication Data

US 2005/0200093 A1    Sep. 15, 2005

(30) Foreign Application Priority Data

| Mar. 15, 2004 | (JP) | ............................. 2004-071912 |
| Mar. 15, 2004 | (JP) | ............................. 2004-071913 |
| Mar. 15, 2004 | (JP) | ............................. 2004-071914 |
| Mar. 15, 2004 | (JP) | ............................. 2004-071915 |

(51) Int. Cl.
B62D 21/00 (2006.01)
(52) U.S. Cl. ...................................... 180/312
(58) Field of Classification Search ................ 180/312, 180/311, 377, 378; 280/781, 784, 788, 796, 280/124.109; 296/204, 205
See application file for complete search history.

(56) References Cited

U.S. PATENT DOCUMENTS 6,516,913 B1    2/2003    Härtel et al.

2003/0127844 A1    7/2003    Gloceri et al.

FOREIGN PATENT DOCUMENTS

| DE | 100 06 388 A1 | 2/2000 |
| JP | 04-090974 | 3/1992 |
| JP | 10305707 A * | 11/1998 |

OTHER PUBLICATIONS

European Search Report dated Sep. 7, 2005 Application No. EP 05 00 4963.

* cited by examiner

*Primary Examiner*—Faye M. Fleming
(74) *Attorney, Agent, or Firm*—Nixon Peabody LLP; Donald R. Studebaker (57) ABSTRACT

The foaming agent is provided in closed spaces of the front portions of the side members which are located from around the front mounts mounted on the rear frame at one ends of the side members to foaming-agent filling openings formed at the middle portions of the side members which form the foam-disposed portions at the side members. The both ends of the front cross member are connected respectively to these foam-disposed portions of the side members.

Accordingly, there can be provided the suspension cross member for an automotive vehicle, comprising the cross member and a pair of side members, which can improve the silent ride, stable maneuverability and impact absorption at the same time.

14 Claims, 8 Drawing Sheets

SUSPENSION CROSS MEMBER OF AUTOMOTIVE VEHICLE

BACKGROUND OF THE INVENTION

The present invention relates to a suspension cross member of an automotive vehicle which supports vehicle wheels, and particularly to a suspension cross member in which a foaming agent is provided.

Conventionally, technology that the foaming agent is provided in the suspension cross member (a sub-frame) is known, as disclosed in, for example, Japanese Patent Laid-Open Publication No. 04-90974. According to this publication, sympathetic vibrations of a vehicle body can be prevented from occurring by the structure disclosed therein.

Herein, it may be preferable that the foaming agent be provided at only appropriate portions of the suspension cross member, instead of being provided at its whole portions, from viewpoints of its costs itself or manufacturing costs. Also, the suspension cross member may be required to be made with a relatively high rigidity, in order to prevent vibrations transferring from the vehicle wheels to the vehicle body so as to improve the silent ride, or to increase the rigidity of the suspension itself so as to ensure the stable maneuverability of the vehicle. Meanwhile, the suspension cross member may also be required to be made so as to properly absorb an impact caused when the vehicle crashes against an obstacle, thereby reducing the crash impact of the vehicle. Conventional suspension cross members, however, could not improve the impact absorption properly, increasing the rigidity thereof, with the foaming agents appropriately provided therein.

SUMMARY OF THE INVENTION

The present invention has been devised in view of the above-described problems, and an object of the present invention to provide a suspension cross member for an automotive vehicle, comprising a cross member and a pair of side members, which can improve the silent ride, stable maneuverability and impact absorption at the same time.

According to the present invention, there is provided a suspension cross member of an automotive vehicle, which is supported on a vehicle frame to support a wheel via a suspension arm, comprising a cross member extending in a width direction of the vehicle, a pair of side members respectively connected with both ends of the cross member at a connection portion thereof and extending in a longitudinal direction of the vehicle at right and left sides of the vehicle, the side members being respectively supported on the vehicle frame at least at one end thereof, wherein each of the side members includes a foam-disposed portion where a foaming agent is provided and a non-foam-disposed portion where no foaming agent is provided therein, and the foam-disposed portion is located at least from the one end of the side member to the connection portion of the side member.

Namely, the foaming agent is provided at least from the one end of the side member to the connection portion of the side member, while it is not provided at another portion of the side member.

Accordingly, since vibrations transferred from a road surface to the suspension cross member via vehicle wheels are reduced at the foam-disposed portion prior to being transferred to the vehicle frame, the vibrations can be prevented properly from being transferred to the vehicle frame and the silent ride can be improved thereby. Further, in the suspension cross member, the above-described portion of each of the side members from the one end to the connection portion with the cross member is the portion which requires its high rigidity particularly. Thus, this portion can be properly strengthened by the foaming agent provided thereat, so that the torsional rigidity of the vehicle can be increased and the stable maneuverability can be improved thereby. Meanwhile, since the non-foam-disposed portion with no foaming agent is also provided, the impact absorption can be ensured properly by this non-foam disposed portion, and the active impact absorption during the vehicle crash can be attained.

According to a preferred embodiment, the cross member includes a foam-disposed portion where the foaming agent is provided. Accordingly, since the rigidity of the suspension cross member in the vehicle width direction is increased, the stable maneuverability can be improved further and the silent ride can be also improved.

According to another preferred embodiment, the suspension cross member is disposed at the rear of vehicle to support rear wheels, the foam-disposed portion is located at a front-side portion of the side member and the non-foam-disposed portion is located at a rear-side portion of side member, the cross member is formed such that a central portion thereof is curved upward so as to cross over a drive shaft of the vehicle, and an additional rear cross member, which includes a non-foam-disposed portion where no foaming agent is provided, is disposed so as to interconnect the non-foam-disposed portions of side members. Accordingly, although the cross member, which is formed in such a curved shape to avoid the drive shaft, tends to decrease the rigidity of the suspension cross member, it can be properly strengthened by the foaming agent provided therein. Thus, the high rigidity of the suspension cross member itself can be ensured, thereby improving the stable maneuverability and the silent ride of the vehicle. Meanwhile, since no foaming agent is provided at the rear cross member, the vehicle-width-direction rigidity can be increased further and the impact absorption by the rear cross member can be improved.

According to another preferred embodiment, the side members are formed in a pipe shape, respectively. Accordingly, since the foaming agent is provided at the portion of each of the pipe-shaped side members from the one end to the connection portion with the cross member, an opening of each one end of the side members is filled with the foaming agent. Thus, the sealing of the side member can be improved and the rustproof effect of the side member can be improved thereby.

According to another preferred embodiment, the suspension cross member is disposed at the rear of vehicle to support rear wheels, and a fuel supply pipe is disposed so as to pass through a space formed between the foam-disposed portion of the side member and the vehicle frame supporting the side member. Accordingly, in the case where the fuel pipe is disposed outside of the vehicle, for example, aiming at ensuring a sufficient large space of vehicle cabin, the fuel supply pipe is disposed so as to pass through the space formed between the foam-disposed portion of the side member and the vehicle frame. Thus, the side member is prevented from being deformed during the vehicle crash, so that a breakage of the fuel supply pipe can be prevented.

According to another preferred embodiment, the cross member includes a weak portion at one side longitudinally thereof, which faces to a specified part of vehicle body or a specified vehicle unit, and a foam-disposed portion where the foaming agent is provided in a closed section thereof at the other side longitudinally thereof. Accordingly, the cross member with the foaming agent provided therein can increase the vehicle-width-direction rigidity of the suspension cross member and the stable maneuverability can be improved thereby. Also, since the cross member includes the foam-disposed portion where the foaming agent is provided at the other side thereof, the specified part of vehicle body or the specified vehicle unit can be prevented from hitting against the suspension cross member during the vehicle crash, and its breakage can be prevented properly.

According to another preferred embodiment, the suspension cross member is disposed at the rear of vehicle to support rear wheels, and the specified vehicle unit is a fuel tank. Accordingly, the suspension cross member supporting vehicle rear wheels can be prevented from being hit against by the fuel tank during the vehicle crash, and the breakage of the fuel tank can be prevented properly.

According to another preferred embodiment, the fuel tank is disposed above the cross member, the weak portion comprises a front vertical wall and an upper wall which connects an upper end of the front vertical wall with the foam-disposed portion, and the front vertical wall is configured so as to be hit against and deformed backward and obliquely by the fuel tank with a slant rear end contacting a lower end of the front vertical wall when a vehicle crash occurs. Accordingly, when the suspension cross member hits against the fuel tank during the vehicle crash, the front vertical wall of the cross member is deformed backward and obliquely by the fuel tank. As a result, the fuel tank can be prevented from hitting against the cross member substantially horizontally, and thus the breakage of the fuel tank can be prevented properly.

According to another preferred embodiment, each of the side members has a closed cross section which extends in the longitudinal direction of the vehicle, the foam-disposed portion is provided in the closed cross section, and an additional rear cross member is disposed so as to interconnect respective rear portions of the side members. Accordingly, the rigidity of the suspension cross member itself can be increased further and the stable maneuverability can be improved further.

According to another preferred embodiment, the cross member includes a reinforcing partition wall extending along a longitudinal direction thereof to separate an inside of the cross member into a front side portion and a rear side portion, whereby the weak portion and the foam-disposed portion can be separated by the partition wall. Accordingly, the foaming agent can be provided in the closed cross-section space formed by the reinforcing partition wall, which can make the structure simple without providing additional partition wall.

According to another preferred embodiment, the weak portion comprises a bead extending in the longitudinal direction of the cross member. Accordingly, since the weak portion comprises the bead extending in the longitudinal direction of the cross member, the vehicle-width-direction rigidity of the cross member can be properly increased, while the longitudinal-direction rigidity can be set at a proper value, not at too high value. Thus, the improvement of the stable maneuverability of the vehicle and the prevention of breakage of the specified part of vehicle body or the specified vehicle unit can be attained.

According to another preferred embodiment, the weak portion comprises a front vertical wall and a horizontal wall which connects either one of upper and lower ends of the front vertical wall with the foam-disposed portion. Accordingly, the weak portion can be formed simply at the cross member.

According to another preferred embodiment, the suspension cross member further comprises a pair of vertical members extending upward from the connection portions of the side members with the cross member, wherein upper ends of the vertical members are supported on the vehicle frame respectively, the above-described one end of the side members which is supported on the vehicle frame is constituted as an one end (e.g., a rear end of the side member) which is located away from the connection portion of the side members, and the foam-disposed portion is located at around the connection portion of the side member and the non-foam-disposed portion is located at the above-described one end (the rear end) which is located away from the connection portion of the side members. Accordingly, since the foam-disposed portion is located at around the connection portion of the side member with the cross member, the rigidity of the connection portion of the side member supported on the vehicle frame with the cross member can be increased, and the vehicle-width-direction rigidity of the suspension cross member can be increased thereby. Also, since the non-foam-disposed portion is located at the above-described one end (the rear end) which is located away from the connection portion of the side members, the impact absorption in the longitudinal direction of the vehicle by the side member during the vehicle crash can be improved and the crash impact can be reduced surely thereby.

According to another preferred embodiment, each of the vertical members includes a foam-disposed portion where the foaming agent is provided, and the cross member includes a foam-disposed portion where the foaming agent is provided at around a portion thereof which is connected with the side members. Accordingly, since the foam-disposed portions are respectively provided at the vertical member supported on the vehicle frame and at around the connection portion of the cross member with the side members, the rigidity of each of the vertical members itself can be increased and the connection rigidity of the vertical member, side members, and cross member can be increased. As a result, the improvement of the vehicle-width-direction rigidity of the suspension cross member can be attained.

According to another preferred embodiment, each of the side members includes a reinforcing partition wall to separate an inside of the side member into a front side portion and a rear side portion, whereby the foam-disposed portion and the non-foam-disposed portion of the side member can be separated by the partition wall. Accordingly, the foaming agent can be provided properly by making use of the reinforcing partition wall.

According to another preferred embodiment, the cross member includes a non-foam-disposed portion at a central portion thereof which is adjacent to a power unit of the vehicle. Accordingly, since the foaming agent is not provided at the central portion of the cross member, the power unit can be prevented from being deformed toward the cabin, contacting the central portion of the cross member. As a result, the cabin can be properly prevented from being broken.

According to another preferred embodiment, the cross member includes a pair of reinforcing partition walls to separate an inside of the side member into both side portions and a central portion, whereby the foam-disposed portion and the non-foam-disposed portion of the cross member can be separated by the partition wall. Accordingly, since the reinforcing partition wall is utilized as a partition wall to separate the foam-disposed portion from the non-foam-disposed portion within the cross member, the structure can be made simple, without providing additional partition wall.

According to another preferred embodiment, the suspension cross member is disposed at the front of vehicle to support front wheels, the cross member includes a steering support portion to support a steering mechanism, and the foam-disposed portion is located from the both ends of the cross member to the steering support portion. Accordingly, sine the rigidity of the steering support portion is increased, the supporting rigidity of the steering mechanism can be increased. Also, since the vibrations is reduced, the stable maneuverability can be improved.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

First, a first embodiment of the present invention will be described referring to FIGS. 1 through 7. Respective frames, members and panels of the embodiment are made of steel.

Figure 1:
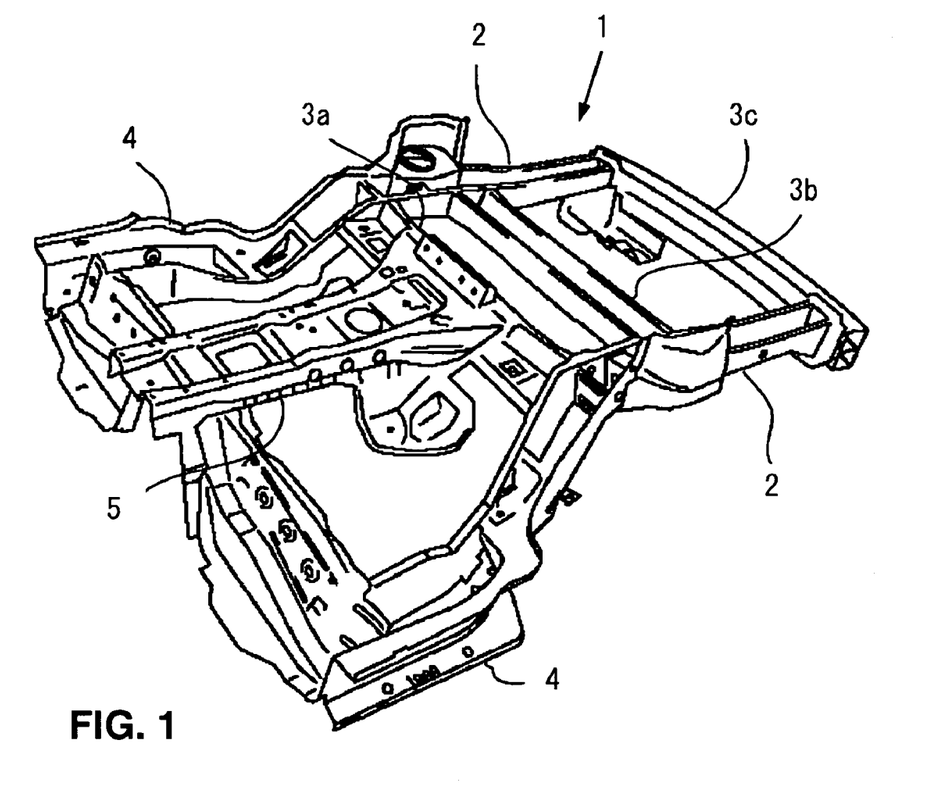
FIG. 1 is a perspective view illustrating a vehicle frame located at a rear side of a vehicle according to a first embodiment of the present invention.

FIG. 1 is a perspective view, when viewed obliquely from the front, of a rear frame 1 constituting part of a rear vehicle structure, particularly a vehicle frame, of a vehicle according to the present embodiment. The rear frame 1, as illustrated in FIG. 1, comprises a pair of rear side frames 2, 2 which extends in a longitudinal direction of the vehicle at right and left sides of the vehicle, and three rear cross members 3a, 3b, and 3c which extend in a vehicle width direction to interconnect the both rear side frames 2, 2. Front portions of the rear side frames 2, 2 extend slant, forward and downward, and lead to and are connected with a pair of side sills 4, 4 which extends in the longitudinal direction at right and left sides of the vehicle. There is provided a tunnel portion 5 which extends forward from a central portion of the foremost cross member 3a.

An upper space above the rear frame 1, side sills 4, 4 and tunnel portion 5 is covered by a rear panel (not illustrated in FIG. 1), and there are provided rear seats 18, 18 (see FIG. 5) in the vehicle width direction on respective portions of the rear panel between the side sills 4, 4 and the tunnel portion 5. Also, a fuel tank 6 (see FIG. 2) is disposed below the rear panel around the rear seats 18, 18, and a suspension cross member 7 (see FIG. 2) is disposed below the rear panel around the cross members 3a and 3b.

Figure 2:
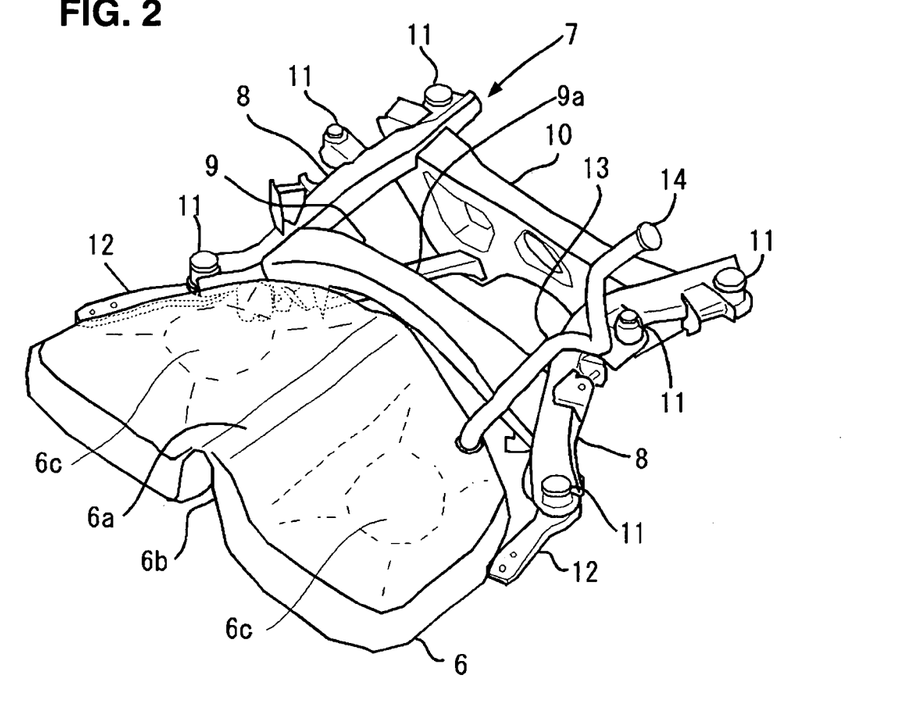
FIG. 2 is a perspective view illustrating a suspension cross member 7 and a fuel tank 6.

FIG. 2 is a perspective view, when viewed obliquely from the front, of the cross member 7 and fuel tank 6 which are disposed below the rear frame 1 and side sills 4, 4, which are illustrated in FIG. 1. The cross member 7 comprises a pair of side members 8, 8 which extends in the longitudinal direction of the vehicle at right and left sides of the vehicle, and a front cross member 9 and a rear cross member 10, which extend in the vehicle width direction to be connected with the side members 8, 8 at both ends thereof, respectively. Herein, each of these members has a closed cross section thereof. Also, at respective front, center and rear portions of the side members 8, 8 are provided mounts 11 . . . 11 which are made of a damping member. These side members 8, 8 are connected with the rear side frames 2, 2 located above these via these mounts 11 . . . 11, respectively. Herein, the side members 8, 8 are formed through a conventional hydro-forming manufacturing process for increasing the rigidity thereof.

Also, a plurality of suspension arms (not illustrated) is coupled to the right and left sides of the suspension cross member 7 at one ends thereof via resilient bushes. The other ends of the suspension arms are coupled to a pair of right-and-left wheel supports (not illustrated) located at the outside of the side members 8, 8 via resilient bushes. These wheel supports are members to rotatably support the rear wheels respectively. The wheel supports are supported on respective suspension towers via suspension components comprising dampers and springs. Thus, the rear wheels are supported via a suspension mechanism so as to be adjustable and controllable with respect to various forces applying to the wheels and compliances during the vehicle running. Herein, there are also provided connecting members 12, 12 to connect with the front portions of the rear side frames 2, 2 at front ends of the side members 8, 8.

The fuel tank 6, which is made of resin, is located in front of the suspension cross member 7 with a specified distance. The fuel tank 6 includes a projecting portion 6a which is formed at the central portion thereof so as to extend longitudinally below the tunnel portion 5. Meanwhile, at the lower face of the fuel tank is formed a groove portion 6b which allows a drive shaft transferring an engine output to the rear wheels, an exhaust pipe exhausting an exhaust gas from the engine and the like, to pass therethrough. Herein, the central portion of the front cross member 9 is curved upward in order to avoid interference with these drive shaft and exhaust pipe. The drive shaft passing through this curved portion 9a is operatively coupled to a differential gear mechanism (not illustrated), which is located between the front and rear cross members 9 and 10 and transfers a drive power from the drive shaft to the respective rear wheels.

Further, a pair of recess portions 6c, 6c is formed at the both upper faces of the fuel tank 6 so as to put the projecting portion 6a therebetween. These recess portions 6c, 6c are formed for a disposition of the above-described rear seats 18, 18. A fuel supply pipe 13 to supply fuel is disposed so as to extend obliquely upward from a right and rear side portion of the fuel tank 6. This fuel supply pipe 13 goes above the front cross member 9 and below the rear panel, then passes through a space above the side member 8 and below the rear side frame 2, and leads to a fuel supply opening 14 formed at a rear fender (not illustrated) (see FIG. 3). There are also provided belts (not illustrated) extending longitudinally, whose both ends are fixed to the floor panel, rear frame 1 or the like respectively so as to support a lower portion of the fuel tank 6 on the vehicle frame. According to this structure of belts, in the event that the floor panel and the rear frame 1 are deformed or any forces act on the fuel tank 6 so as to push it downward during the vehicle crash, the fuel tank 6 is allowed to be moved downward. As a result, the fuel tank can be prevented properly from being broken.

Figure 3:
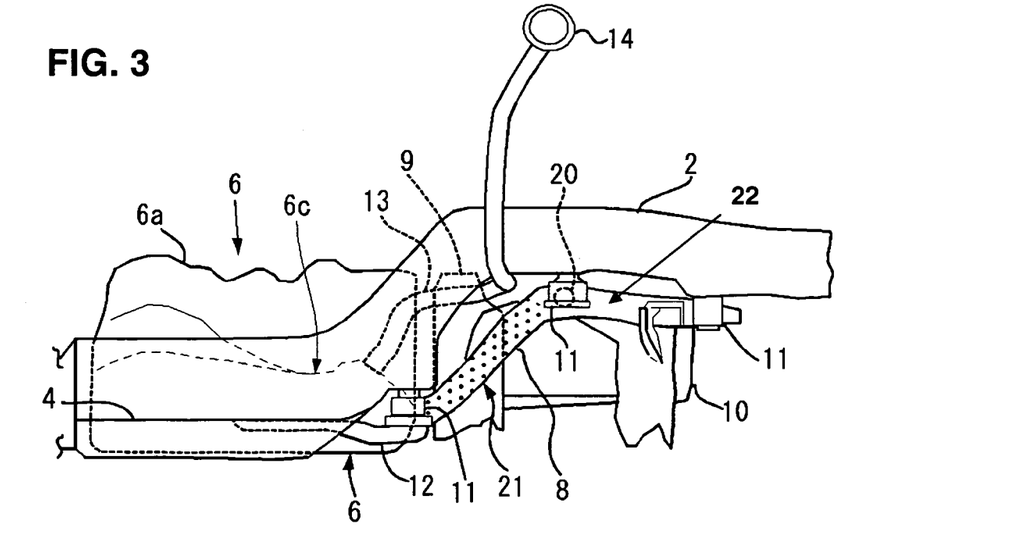
FIG. 3 is a side view illustrating a vehicle body structure at the rear side of the vehicle.
Figure 4:
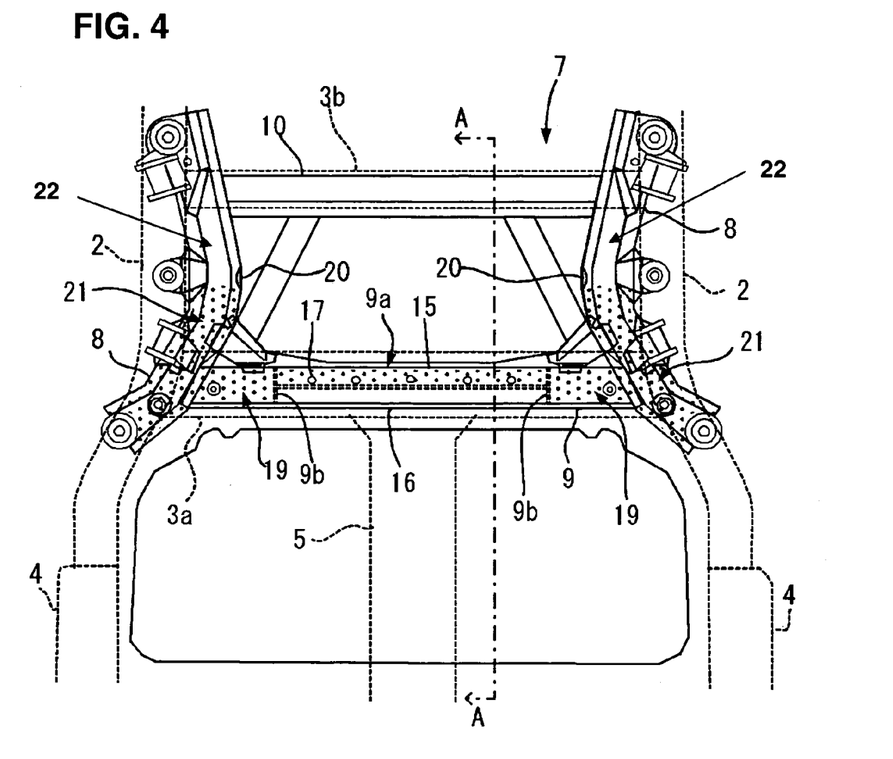
FIG. 4 is a plan view illustrating the suspension cross member 7 and the fuel tank 6.

FIG. 3 is a side view of the rear frame 1, suspension cross member 7 and fuel tank 6. Herein, a foam-disposed portion where a foaming agent is located in the side members 8, 8 is illustrated by dots. FIG. 4 is a plan view of the suspension cross member 7 and fuel tank 6 illustrated in FIG. 2. Herein, the rear frame 1, side sills 4, 4 and tunnel portion 5 are illustrated by broken lines, and the foam-disposed portions where the foaming agent is provided are illustrated by dots. At around the curved portion 9a of the central portion of the front cross member 9, i.e., a portion enclosed by right and left partition walls 9b, 9b, are provided a curved-portion foam-disposed portion 15 and a weak portion 16. The foam-disposed portion 15 is located at the rear side of the vehicle and the weak portion 16 is located at the front side of the vehicle.

Figure 5:
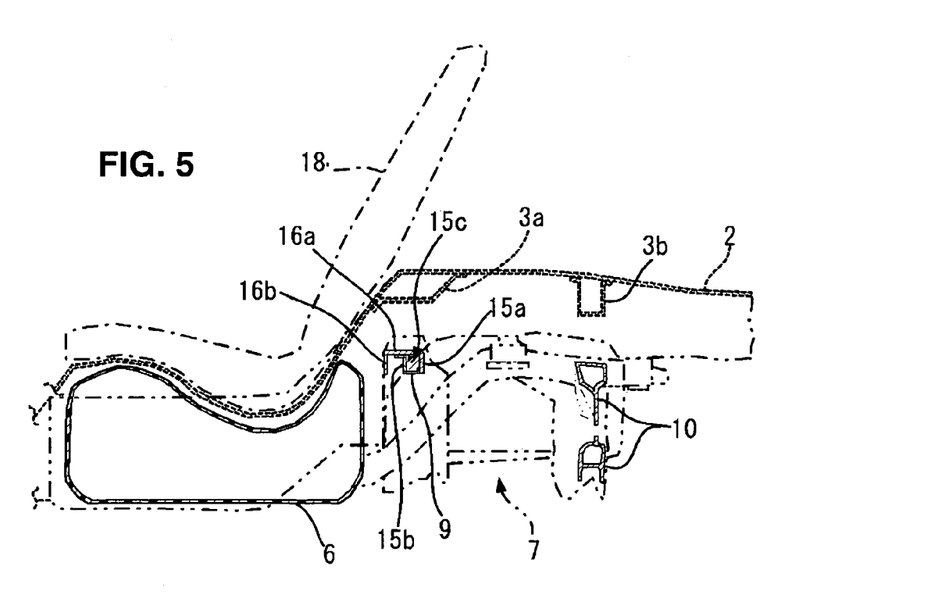
FIG. 5 is a sectional view taken along line A-A of FIG. 4.

Hereinafter, these portions 15 and 16 will be described in detail. As illustrated in FIG. 5 which is a sectional view of FIG. 4 taken along line A-A, the foam-disposed portion 15 is formed by a rear-side outer wall 15a of the front cross member 9 and a partition wall 15b which is made of a steel plate and reinforces the front cross member 9. These outer wall 15a and the partition wall 15b are connected with each other so as to form a closed cross section which extends in the longitudinal direction of the front cross member 9. A foaming agent 15c is provided in this closed cross section. The foaming agent 15c is configured of a foaming resin with high hardness and high strength, specifically such as polyurethane or epoxy resin, with an expansion ratio of less than tree times. The filling of the forming agent into the closed space is conducted via filling holes 17 . . . 17 which are formed at the foam-disposed portion 15. By filling the foaming agent 15c into the cross member 9 this way, the rigidity of the cross member 9 can be increased properly without increasing the weight of the members. Accordingly, the torsional rigidity of the suspension cross member 7 can be increased, and the stable maneuverability can be improved thereby.

The weak portion 16 located at the front side of the curved portion 9a comprises a horizontal wall 16a which extends forward from an upper wall of the outer wall 15a of the foam-disposed portion 15 and a vertical wall 16b which extends downward from a front end of the horizontal wall 16a. Herein, a rear upper end of the fuel tank 6 is located at substantially the same level as the curved portion 9a of the front cross member 9 or a little lower than that. Further, the upper face of the rear end of the fuel tank 6 is formed so as to have a slant face with its rear end being located lower.

Figure 6:
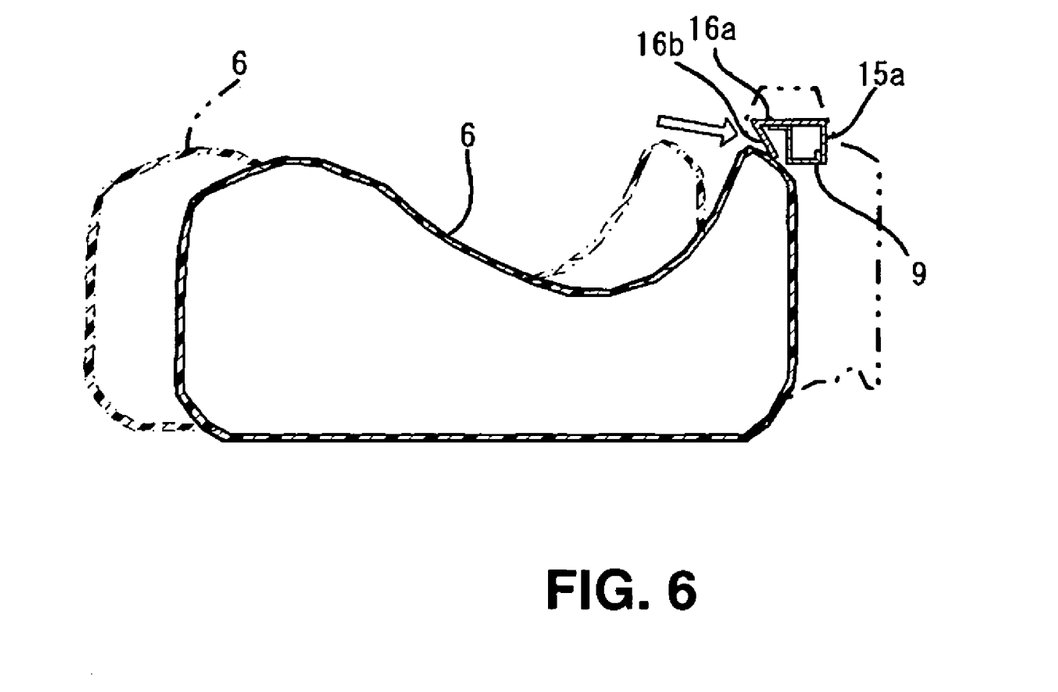
FIG. 6 is an explanatory diagram of a state of contact of the fuel tank 6 with a front cross member 9 during a vehicle crash.

According to the above-described structure, when the vehicle crashes against obstacles at the front or rear and the fuel tank 6 is moved back (in an arrow direction in FIG. 6) thereby and then its rear end contacts the curved portion 9a of the front cross member 9, the vertical wall 16b is pushed and bent backward and obliquely, as illustrated in FIG. 6, by the contact with the above-described upper face of the rear end of the fuel tank 6. Accordingly, the fuel tank 6 can be prevented from hitting against the relatively strong foam-disposed portion 15 of the front cross member 9 substantially horizontally, and thus the breakage of the fuel tank 6 can be prevented properly. Further, since there occurs a force acting on the fuel tank 6 to push it downward by the contact of the fuel tank 6 with the vertical wall 16b during the vehicle crash, the fuel tank 6 can be allowed to be moved downward by loosening the tank-supporting belts. As a result, the fuel tank 6 can be further prevented from hitting against the foam-disposed portion 15 of the front cross member 9. Reference numeral 18 in FIG. 5 denotes the rear seat.

The foaming agent is provided not only at the above-described curved portion 9a, but also at other members and portions, which will be described below. As illustrated in FIG. 4, the foaming agent is also provided in closed spaces 19, 19 which are located at the outside of the right and left partition walls 9b, 9b in the front cross member 9.

Also, as illustrated in FIGS. 3 and 4, the foaming agent is provided in closed spaces of the front portions of the side members 8, 8 which are located from around the front mounts 11, 11 mounted on the rear frame 1 at one ends of the side members 8, 8 to foaming-agent filling openings 20, 20 formed at the middle portions of the side members 8, 8, which form the foam-disposed portions 21, 21 at the side members 8, 8. The both ends of the front cross member 9 are connected respectively to these foam-disposed portions of the side members 8, 8. Generally, during the vehicle running, vibrations from the road surface are transferred to the suspension cross member 7 via vehicle wheels, and these vibrations may make uncomfortable noises for the passengers in the vehicle via being further transferred to the entire vehicle frame via the side frames 2, 2. According to the above-described structure, however, the noises can be reduced properly. Namely, the above-described vibrations transferred to the suspension cross member 7 are absorbed and reduced by the foaming agent provided at the foam-disposed portions 21, 21 prior to being transferred to the rear frame 1. As a result, the vibrations can be prevented properly from being transferred to the side frames 2, 2 and the silent ride can be improved thereby. Also, in the suspension cross member 7, the portions from the supporting portions on the rear frames 2, 2 at the front mounts 11, 11 to the connection portions with the front cross member 9 are portions which require their high rigidity particularly. Thus, these portions can be properly strengthened by the foaming agent provided thereat, so that the torsional rigidity of the vehicle can be increased and the stable maneuverability can improved thereby. In the present embedment, particularly, since the front cross member 9 with foaming agent and the foam-disposed portions 21, 21 are connected by fixing, the connecting rigidity can be increased, and the torsional rigidity of the vehicle can be increased further and the stable maneuverability can improved further thereby.

Meanwhile, since no foaming agent is provided at the rear portions 22, 22 of the side members 8, 8 behind the foaming-agent filling openings 20, 20, the non-foaming-disposition portions 22, 22 are positively deformed so as to absorb the crash impact during the vehicle crash. Thus, the impact transferred to the vehicle can be reduced. In this case, since no foaming agent is also provided at the rear cross member 10, the impact absorption can be further improved, with the rigidity increased by the rear cross member 10. Herein, the rear cross member 10 can be configured so as to have a larger closed cross section than that of the front cross member 9 as illustrated in FIG. 5 because the rear cross member 10 does not interfere with the drive shaft. As a result, the rear cross member 10 can be made easily deformable, thereby improving the impact absorption.

In the present embodiment, the front end portions of the side members 8, 8 are located at the lower level than their central portions where the foaming-agent filling openings 20, 20, are formed. Meanwhile, the side members 8, 8 are made through the hydro-forming manufacturing process, with the closed cross sections in their longitudinal direction. Herein, since the foaming agent provided at the front side portion of the side members 8, 8 can prevent any rainwater from invading into the side members 8, 8 from the front end portions, the rustproof effect of the inside of the side members 8, 8 can be improved.

Also, the fuel supply pipe 13 is disposed at the outside of the vehicle, for example, aiming at providing a sufficient large space of vehicle cabin, passing through the space formed between the side frame 2 and the side member 8. Thus, since the fuel supply pipe 13 is enclosed by the foam-disposition portion 21 of the side member 8, the foam-disposition portion 21 is prevented from being deformed during the vehicle crash, so that the breakage of the fuel supply pipe 13 can be prevented. In the present embodiment, particularly, the foam-disposition portion 21 is provided at the side member 8 between the front-side mount 11 and the central-side mount 11, and the fuel supply pipe 13 passes through the space formed by the side member 8 and the side frame 2 between these mounts 11, 11. Accordingly, since the periphery of the space is prevented properly from being deformed, the breakage of the fuel supply pipe 13 can be prevented surely.

Figure 7:
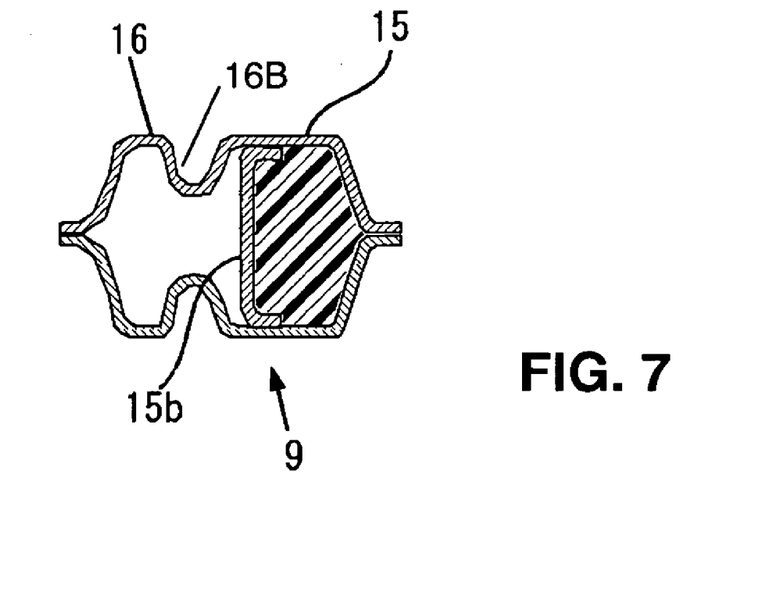
FIG. 7 is a sectional view illustrating a modified structure of the front cross member 9.

Although the weak portion 16 comprises the horizontal wall 16*a* and the vertical wall 16*b* in the above-described embodiment, other modified weak structures may be applied. For example, as illustrated in FIG. 7, the weak portion 16 may comprise beads 16B which extend in the longitudinal direction of the front cross member 9 before the partition wall 15*b*. Thus, since the beads 16B increase the vehicle-width-direction rigidity of the front cross member 9 without improperly increasing the longitudinal-direction rigidity of that, the effect of breakage prevention of the fuel tank 6 can be further improved, with the improved stable maneuverability.

Also, although the fuel tank 6 is disposed in front of the front cross member 9 of the vehicle in the above-described embodiment, other vehicle components, such as a vertical wall of the floor panel forming a foot space of the passenger on the rear seat, i.e., a kickup panel, may be disposed before the front cross member 9. In this case, the vehicle cabin structure can be also prevented from being deformed improperly by the contact of the kickup panel with the front cross member 9 during the vehicle crash.

Next, a second embodiment in which the present invention is applied to a front suspension cross member will be described referring to FIGS. 8 through 14. Respective frames, members and panels of the embodiment are made of steel.

Figure 8:
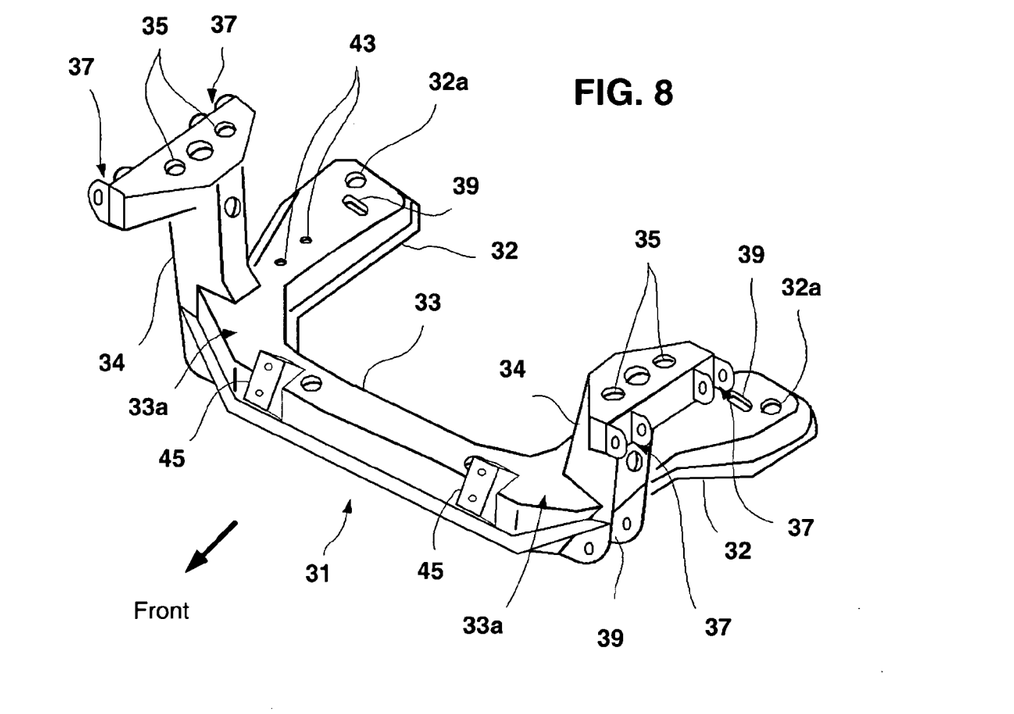
FIG. 8 is a perspective view illustrating a front suspension cross member 31 according to a second embodiment of the present invention.
Figure 9:
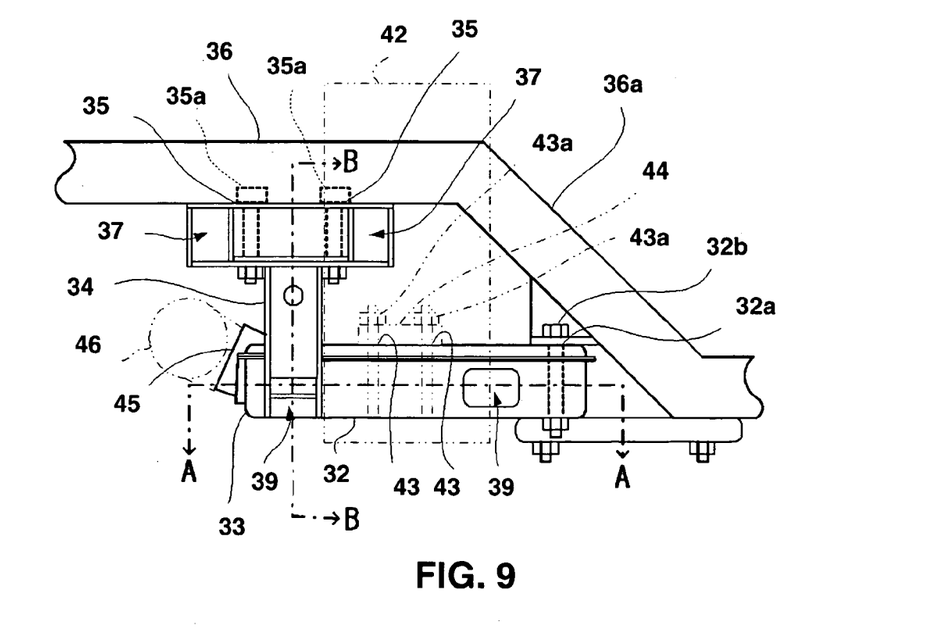
FIG. 9 is a side view illustrating the front suspension cross member 31 and others.
Figure 10:
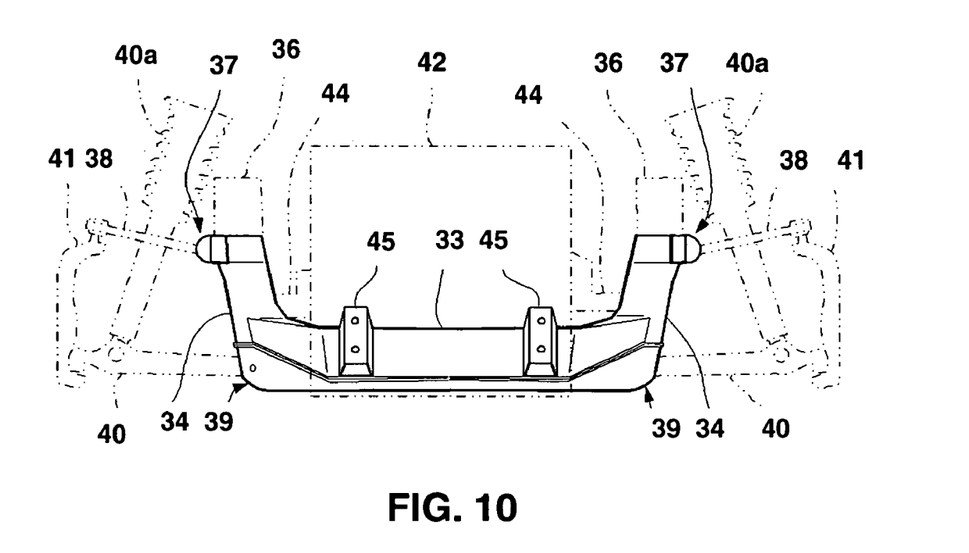
FIG. 10 is an elevation view illustrating the front suspension cross member 31 and others.
Figure 11:
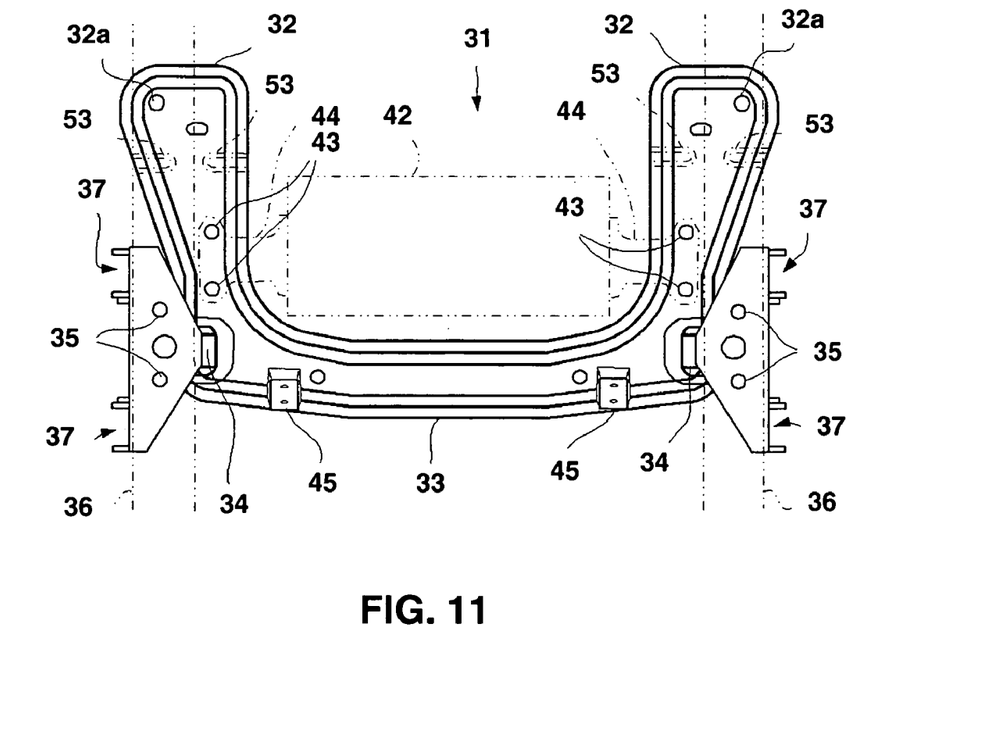
FIG. 11 is a plan view illustrating the front suspension cross member 31 and others.

At first, an entire structure of a front suspension cross member 31 according to the second embodiment will be described referring to FIG. 8 through 11. FIG. 8 is a perspective view, when viewed obliquely from the front, of the suspension cross member 31. FIG. 9 is a perspective view of the suspension cross member 31. FIG. 10 is an elevation view of the suspension cross member 31. FIG. 11 is a plan view of the suspension cross member 31. The suspension cross member 31, as illustrated in FIG. 8, comprises a pair of side members 32, 32 which extend in the longitudinal direction of the vehicle at right and left sides of the vehicle, and a cross member 33 which extends in the vehicle width direction so as to interconnect respective front end portions of the side members 32, 32. Also, a pair of vertical members 34, 34 is provided so as to extend upward from respective connection portions 33*a*, 33*a* of the side members 32, 32 with the cross member 33.

Upper end portions of the vertical members 34, 34, as illustrated in FIG. 9, are fixed to lower faces of a pair of front side frames 36, 36, which extends in the longitudinal direction of the vehicle and form part of the vehicle frame constituting the vehicle front structure, by a fastening means such as bolts 35*a*, 35*a* getting through attaching holes 35 . . . 35. Each of side frames 36, 36 has a slant portion 36*a* which goes down and backward at its rear side behind a connection with the vertical member 34. Each rear end portion of the side members 32, 32 is fixed to an lower face of the slant portion 36*a* by a fastening means such as bolts 32*b*, 32*b* getting through attaching holes 32*a*, 32*a*. Thus, the suspension cross member 31 is fixed to the front side frames 36, 36 firmly.

At the upper end portions of the vertical members 34, 34 are provided upper-arm support portions 37 . . . 37 at front and rear sides respectively. Upper arms 38, 38 constituting suspension arms of the vehicle are pivotally supported on these upper-arm support portions 37 . . . 37 via resilient bushes (not illustrated) (see FIG. 10). Also, as illustrated in FIG. 8, at the side members 32, 32 are provided lower-arm support portions 39 . . . 39 at front and rear sides respectively. And, lower arms 40, 40 constituting suspension arms of the vehicle are pivotally supported on these lower-arm support portions 39 . . . 39 via resilient bushes (not illustrated) (see FIG. 10).

As illustrated in FIG. 10, support members 41, 41 are pivotally connected to respective outer ends of the upper and lower arms 38, 38 and 40, 40, and front wheels (not illustrated) are rotatably supported on the supported members 41, 41. The upper and lower arms 38, 38 and 40, 40 of the present embodiment are comprised of A-shaped suspension arms, and suspension damper devices 40*a*, 40*a* comprising springs and dampers are supported on the lower arms 40, 40.

A power unit 42 which comprises an engine, a transmission and so on, as illustrated in FIGS. 9, 10 and 11, is provided in a space between the side members 32, 32 and in back of the cross member 33 in such a manner that a lower portion of the power unit 42 is away from these members. Also, engine-mount attaching holes 13 . . . 13 are formed at upper faces of the side members 32, 32 at around their central portions, and engine mounts 44, 44 formed at both sides of the power unit 42 are fixed to the side members 32, 32 by a fastening means such as bolts 43*a*, 43*a* getting through the attaching holes 43, 43.

Also, at the front end of the cross member 33 are formed steering-shaft attaching portions 45, 45 with slant attaching faces at right and left sides. A steering shaft 46 is supported on the attaching portions 45, 45, and both ends of the steering shaft 46 are linked to the support members respectively, which is not illustrated here. Further, there is provided a steering gear mechanism comprising a rack and pinion mechanism (not illustrated) at the left side of the steering shaft 46, when viewed from the front, and a steering wheel located in the cabin is operatively coupled to this steering gear mechanism via steering shafts. Thus, the front wheels is steered by the operation of the steering wheel.

Figure 12:
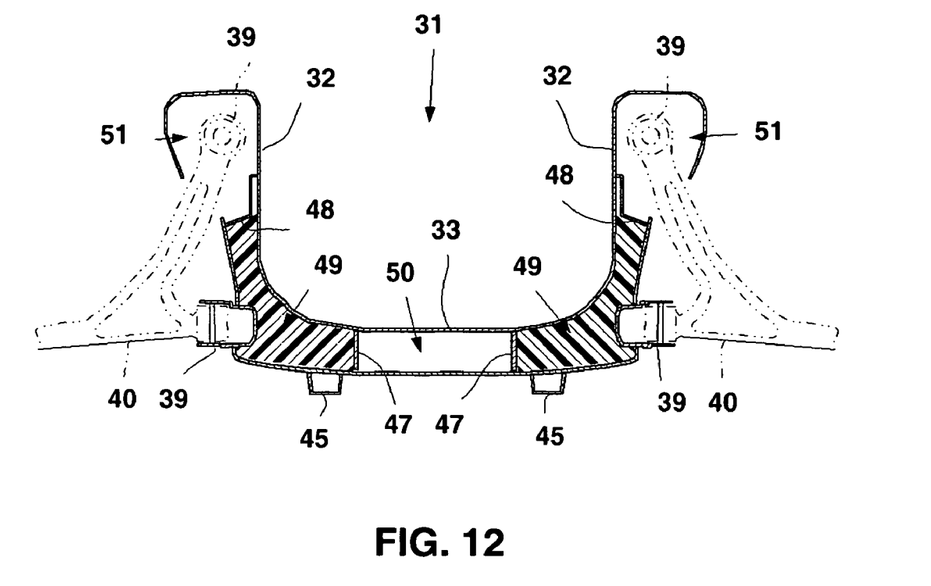
FIG. 12 is a sectional view taken along line A-A of FIG. 9.
Figure 13:
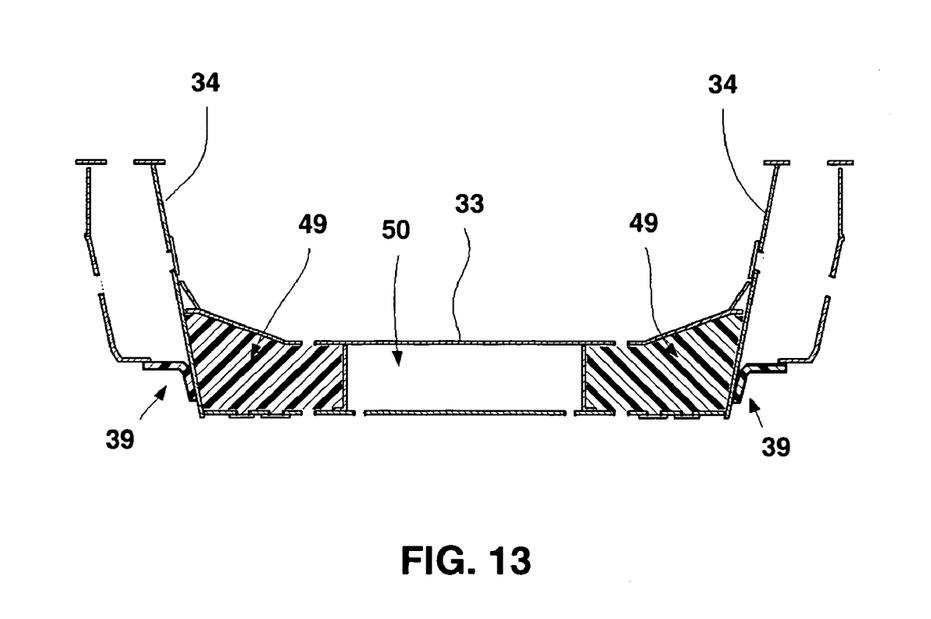
FIG. 13 is a sectional view taken along line B-B of FIG. 9.

Next, the filling of the foaming agent into the suspension cross member 31 will be described referring to FIGS. 12 and 13. FIG. 12 is a sectional view taken along line A-A of FIG. 9, and FIG. 13 is a sectional view taken along line B-B of FIG. 9. The foaming agent is configured of a foaming resin with high hardness and high strength, specifically such as polyurethane or epoxy resin, with an expansion ratio of less than tree times. The members of the side members 32, 32, cross member 33, vertical members 34, 34 and so on are made, for example, by combing two press-formed steel plates or through hydro-forming manufacturing process, and include a hollow space therein accordingly. By filling the foaming agent into the hollow space of the members, the rigidity of these members can be increased properly without increasing the weight of the members. The filling of the foaming agent is conducted by providing the foaming agent with a high viscosity into the space via filing holes formed at the members and then making it become hard.

As illustrated in FIG. 12, there are provided partition walls 47, 47 to reinforce the cross member 33 itself in the cross member 33 at its both sides, and there are also provided partition walls 48, 48 to reinforce the respective side members 32, 32 in the side members 32, 32. Then, the foaming agent is provided in respective spaces enclosed by the partition walls 47, 47 and 48, 48 at the connection portion between the cross member 33 and the side members 32, 32, which constitute foaming-disposition portions 49, 49. Meanwhile, a non-foam-disposition portion 50 where no foaming agent is provided is formed at the central portion of the cross member 33. There are also provided non-foam-disposition portions 51, 51, where no foaming agent is provided, at respective rear spaces behind the partition walls 48, 48 of the side members 32, 32 (including the lower-arm support portions 39, 39).

Also, as illustrated in FIG. 13, no foaming agent is provided in the vertical members 33, 33 in the present embodiment.

Next, the operation and effect of the present embodiment will be described. Thus, the connecting rigidity of the cross member 33 and the side members 32, 32 can be increased by the foaming agent 49, 49 provided at the connection portions. Also, since the side members 32, 32 are fixed to the front side frames 36, 36 at their rear ends, the entire rigidity of the cross member 33 and the side members 32, 32, mainly the vehicle-width-direction rigidity thereof, can be increased. At the same time, the silent and comfortable ride can be improved by reducing vibrations of the suspension cross member 31. Herein, the suspension device of the present embodiment comprises A-shaped suspension arms which support respectively the wheel support members 41, 41 (see FIG. 10) which are located just at the outside of the front lower-arm support portions 39, 39. Accordingly, side forces applying to the front wheels during the vehicle turning are directly transferred to the cross member 33 via the front lower-arm support portions 39, 39. Thus, by increasing the vehicle-width-direction rigidity of the suspension cross member 31 with the cross member 33 and the side members 32, 32 of the present embodiment described above, the stable maneuverability of the vehicle during the vehicle turning can be further improved. And also, the vibrations transferred from the road surface to the lower arms 40, 40 and front lower-arm support portions 39, 39 can be further reduced by the foaming agent provided, so that the vibrations can be restrained from being transferred to the front side frames 36, 36. Further, since the vertical members 34, 34 supported on the front side frames 36, 36 are connected to the foam-disposed portions 49, 49 provided at the connection portion, the rigidity of the suspension cross member 31 can be further increased.

Meanwhile, since the non-foam-disposed portions 51, 51 with no foaming agent is also provided at the side members, the suspension cross member 31 can be prevented from increasing its longitudinal-direction rigidity too much. Thus, the impact absorption can be ensured properly by these non-foam disposed portions, and the active impact absorption during the vehicle crash can be attained.

Also, since the non-foam-disposed portion 50 is provided at the central portion of the cross member 33, the power unit 42 can be prevented from being deformed toward the cabin during the vehicle crash, contacting the cross member 33 and the power unit 42. Namely, when the vehicle crash happens, there occurs a force acting on the cross member 33 which will move the power unit 42 backward by the contacting of the cross member 33 and the power unit 42. The non-foam-disposed portion 50, however, includes no foaming agent, and therefore it tends to be easily deformable, compared with the foam-disposed portion. Accordingly, the non-foam-disposed portion 50 can absorb and reduce the above-described force to move the power unit 42 backward.

Herein, according to the present embodiment, the above-described non-foam-disposed portions 51, 51 provided at the side members would allow the longitudinal length of the side members to be shortened by the impact absorption thereby. In this case, since the power unit 42 is located between the side members 32, 32, the force to move the power unit 42 backward might be increased during the vehicle crash. However, since the disposition of the non-foam-disposed portion 50 provided at the central portion of the cross member 33 can reduce the force as described above, the backward movement of the power unit 42 can be prevented properly.

Also, since the steering-shaft attaching portions 45, 45 are provided at the foam-disposed portions 49, 49 provided at the connection portion, not at the non-foam-disposed portion 50 provided at the central portion of the cross member 33, the rigidity of the steering-shaft attaching portions 45, 45 can be increased and the supporting rigidity of the steering shaft 46 can be increased thereby. As a result, the stable maneuverability of the vehicle can be improved. Also, any additional reinforcing members, such as reinforcing walls which used to be provided at the inside of the cross member 33 near the steering-shaft attaching portions 45, 45 of the conventional device, may not be necessary.

Figure 14:
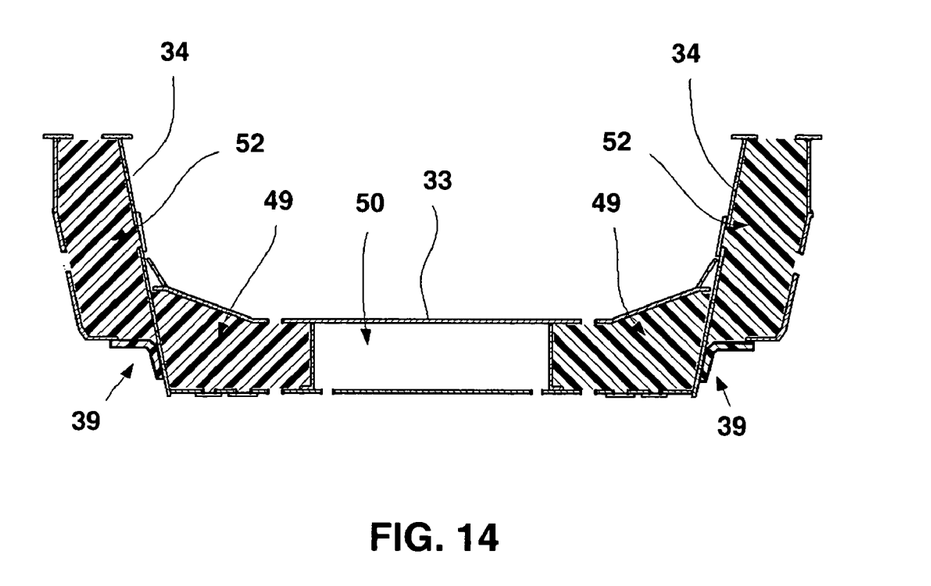
FIG. 14 is a sectional view taken along line B-B of FIG. 9 according to a modified embodiment.

Next, a modified suspension cross member 31 of the present embodiment will be described referring to FIG. 14. Although the vertical members 34, 34 of the above-described embodiment include no foaming agent, the modified embodiment has the foaming agent provided in the vertical members 34, 34 as illustrated in FIG. 14.

This modified embodiment can also increase the rigidity of the suspension cross member 31 in the vehicle width direction primarily. Namely, since the vertical members 34, 34 are directly supported on the front side frames 36, 36, the entire rigidity of the vertical members 34, 34 and cross member 33, mainly the vehicle-width-direction rigidity thereof, can be increased with the foaming agent provided in the both members. Thus, the vehicle-width-direction rigidity of the suspension cross member 31 can be increased, and the stable maneuverability during the vehicle tuning can be improved thereby. And also, the vibrations transferred from the road surface to the lower arms 40, 40 and front lower-arm support portions 39, 39 can be reduced by the foaming agent provided, so that the vibrations can be restrained from being transferred to the front side frames 36, 36 via the vertical members 34, 34. Further, the impact reduction by the non-foam-disposed portions 51, 51 provided at the side members can be attained when the vehicle crashes in the longitudinal direction primarily, like the above-described embodiment. Also, the power unit 42 can be restrained from being moved toward the cabin by the non-foam-disposed portion 50 provided at the central portion of the cross member.

Further, since the vehicle-width-direction rigidity of the suspension cross member 31 of the present embodiment is also increased by the foam-disposed portions 49, 49 provided at the connection portion like the above-described embodiment, the further improvement of the stable maneuverability can be attained. Herein, sine the vehicle-width-direction rigidity of the suspension cross member 31 of the present embodiment is increased by the vertical members 34,34, the foam-disposed portions 49, 49 provided at the connection portion like the above-described embodiment would not be necessary. Accordingly, the foaming agent may be provided only at the cross member 33, without providing the foaming agent at the side members 32, 32.

Herein, although the cross member 33 includes the non-foam-disposed portion 50 provided at the central portion thereof in the above-described embodiments, the present invention can be applied to the cross member 33 without the non-foam-disposed portion, namely the cross member 33 where the foaming agent is provided in the whole area of the cross member. Further, as illustrated in FIG. 11, there may be provided beads 53, 53 which extend in the vehicle width direction at the non-foam-disposed portions 51, 51 provided at the side members. Also, although the power unit 42 is disposed behind the cross member 33 in the above-described embodiment, the present invention can be applied to an embodiment in which the power unit 42 is disposed before the cross member 33. In this case, the stable maneuverability and the silent riding can be ensured and the crash impact can be properly reduced as well.

The present invention should not be limited to the above-described embodiments, but any other modifications and improvements may be applied within the scope of a sprit of the present invention.

What is claimed is:

1. A suspension cross member of an automotive vehicle, which is supported on a vehicle frame to support a wheel via a suspension arm, comprising:
   a cross member extending in a width direction of the vehicle;
   a pair of side members respectively connected with both ends of said cross member at a connection portion thereof and extending in a longitudinal direction of the vehicle at right and left sides of the vehicle, the side members being respectively supported on the vehicle frame at least at one end and the other end thereof,
   wherein each of said side members includes a foam-disposed portion where a foaming agent is provided and a non-foam-disposed portion where no foaming agent is provided therein, said foam-disposed portion is located at least from said one end of the side member to said connection portion of the side member, and said cross member includes a foam-disposed portion where the foaming agent is provided along a longitudinal direction of the cross member.

2. A suspension cross member of an automotive vehicle, which is supported on a vehicle frame to support a wheel via a suspension arm, comprising:
   a cross member extending in a width direction of the vehicle;
   a pair of side members respectively connected with both ends of said cross member at a connection portion thereof and extending in a longitudinal direction of the vehicle at right and left sides of the vehicle, the side members being respectively supported on the vehicle frame at least at one end thereof,
   wherein each of said side members includes a foam-disposed portion where a foaming agent is provided and a non-foam-disposed portion where no foaming agent is provided therein, said foam-disposed portion is located at least from said one end of the side member to said connection portion of the side member, said cross member includes a foam-disposed portion where the foaming agent is provided, said suspension cross member is disposed at the rear of vehicle to support rear wheels, said foam-disposed portion of the side member is located at a front-side portion of said side member and said non-foam-disposed portion of the side member is located at a rear-side portion of said side member, said cross member is formed such that a central portion thereof is curved upward so as to cross over a drive shaft of the vehicle, and an additional rear cross member, which includes a non-foam-disposed portion where no foaming agent is provided, is disposed so as to interconnect said non-foam-disposed portions of said both side members.

3. A suspension cross member of an automotive vehicle, which is supported on a vehicle frame to support a wheel via a suspension arm, comprising:
   a cross member extending in a width direction of the vehicle;
   a pair of side members respectively connected with both ends of said cross member at a connection portion thereof and extending in a longitudinal direction of the vehicle at right and left sides of the vehicle, the side members being respectively supported on the vehicle frame at least at one end thereof,
   wherein each of said side members includes a foam-disposed portion where a foaming agent is provided and a non-foam-disposed portion where no foaming agent is provided therein, said foam-disposed portion is located at least from said one end of the side member to said connection portion of the side member, said suspension cross member is disposed at the rear of vehicle to support rear wheels, and a fuel supply pipe is disposed so as to pass through a space formed between said foam-disposed portion of the side member and said vehicle frame supporting the side member.

4. The suspension cross member of an automotive vehicle of claim 2, wherein said suspension cross member is disposed at the rear of vehicle to support rear wheels, and said specified vehicle unit is a fuel tank.

5. The suspension cross member of an automotive vehicle of claim 4, wherein each of said side members has a closed cross section which extends in the longitudinal direction of the vehicle, said foam-disposed portion of the side member is provided in said closed cross section, and said additional rear cross member is disposed so as to interconnect respective rear portions of said side members.

6. A suspension cross member of an automotive vehicle, which is supported on a vehicle frame to support a wheel via a suspension arm, comprising:
- a cross member extending in a width direction of the vehicle;
- a pair of side members respectively connected with both ends of said cross member at a connection portion thereof and extending in a longitudinal direction of the vehicle at right and left sides of the vehicle, the side members being respectively supported on the vehicle frame at least at one end thereof,
- wherein each of said side members includes a foam-disposed portion where a foaming agent is provided and a non-foam-disposed portion where no foaming agent is provided therein, said foam-disposed portion is located at least from said one end of the side member to said connection portion of the side member, and said suspension cross member further comprises a pair of vertical members extending upward from said connection portions of the side members with said cross member, wherein upper ends of said vertical members are supported on the vehicle frame respectively, said one end of the side members which is supported on the vehicle frame is constituted as an one end which is located away from said connection portion of the side members, and said foam-disposed portion is located at around said connection portion of the side member and said non-foam-disposed portion is located at said one end which is located away from said connection portion of the side members.

7. The suspension cross member of an automotive vehicle of claim 6, wherein each of said vertical members includes a foam-disposed portion where the foaming agent is provided, and said cross member includes a foam-disposed portion where the foaming agent is provided at around a portion thereof which is connected with said side members.

8. The suspension cross member of an automotive vehicle of claim 6, wherein each of said side members includes a reinforcing partition wall to separate an inside of the side member into a front side portion and a rear side portion, whereby said foam-disposed portion and said non-foam-disposed portion of the side member can be separated by said partition wall.

9. The suspension cross member of an automotive vehicle of claim 7, wherein said cross member includes further a non-foam-disposed portion, where no foaming agent is provided, at a central portion thereof which is adjacent to a power unit of the vehicle.

10. The suspension cross member of an automotive vehicle of claim 9, wherein said cross member includes a pair of reinforcing partition walls to separate an inside of the side member into both side portions and a central portion, whereby said foam-disposed portion and said non-foam-disposed portion of the cross member can be separated by said partition wall.

11. The suspension cross member of an automotive vehicle of claim 9, wherein said suspension cross member is disposed at the front of vehicle to support front wheels, said cross member includes a steering support portion to support a steering mechanism, and said foam-disposed portion is located from the both ends of the cross member to said steering support portion.

12. A suspension cross member of an automotive vehicle, which is supported on a vehicle frame to support a wheel via a suspension arm, comprising:
- a cross member extending in a width direction of the vehicle;
- a pair of side members respectively connected with both ends of said cross member at a connection portion thereof and extending in a longitudinal direction of the vehicle at right and left sides of the vehicle, the side members being respectively supported on the vehicle frame at least at one end thereof; and
- a pair of vertical members extending upward from connection portions of said side members with said cross member, upper ends of the vertical members being respectively supported on the vehicle frame,
- wherein each of said side members includes a foam-disposed portion where a foaming agent is provided and a non-foam-disposed portion where no foaming agent is provided therein, and said foam-disposed portion is located at around said connection portion of the side member with the cross member and said non-foam-disposed portion is located at around said one end of the side member which is supported on the vehicle frame.

13. The suspension cross member of an automotive vehicle of claim 12, wherein said cross member includes a foam-disposed portion where the foaming agent is provided at around a portion thereof which is connected with said side members and a non-foam-disposed portion where no foaming agent is provided at a central portion thereof which is adjacent to a power unit of the vehicle.

14. The suspension cross member of an automotive vehicle of claim 13, wherein said cross member includes a pair of reinforcing partition walls to separate an inside of the side member into both side portions and a central portion, whereby said foam-disposed portion and said non-foam-disposed portion of the cross member can be separated by said partition wall.

* * * * *